US011544476B2

(12) United States Patent
Kang et al.

(10) Patent No.: US 11,544,476 B2
(45) Date of Patent: Jan. 3, 2023

(54) METHOD AND APPARATUS FOR CUSTOMIZING NATURAL LANGUAGE PROCESSING MODEL

(71) Applicant: SAMSUNG SDS CO., LTD., Seoul (KR)

(72) Inventors: Na Un Kang, Seoul (KR); Jae Hoon Lee, Seoul (KR); Wang Geun Park, Seoul (KR); Jea Hyun Park, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 235 days.

(21) Appl. No.: 16/884,795

(22) Filed: May 27, 2020

(65) Prior Publication Data

US 2021/0365640 A1 Nov. 25, 2021

(30) Foreign Application Priority Data

May 19, 2020 (KR) ........................ 10-2020-0059639

(51) Int. Cl.
*G06F 40/40* (2020.01)
*G06K 9/62* (2022.01)
*G06V 30/414* (2022.01)
*G06V 30/416* (2022.01)

(52) U.S. Cl.
CPC ........... *G06F 40/40* (2020.01); *G06K 9/6256* (2013.01); *G06V 30/414* (2022.01); *G06V 30/416* (2022.01)

(58) Field of Classification Search
CPC .......... G06F 40/40; G06F 40/58; G06F 40/42; G06K 9/6256; G06K 9/6255; G06K 9/6263; G06V 30/414; G06V 30/416; G06N 20/00
See application file for complete search history.

(56) References Cited

U.S. PATENT DOCUMENTS

2019/0251150 A1* 8/2019 Vinay .................. G06N 3/0454
2020/0293712 A1* 9/2020 Potts .................. G06F 3/04842

FOREIGN PATENT DOCUMENTS

KR 10-2018-0055189 A 5/2018

* cited by examiner

*Primary Examiner* — Qian Yang
(74) *Attorney, Agent, or Firm* — The PL Law Group, PLLC

(57) ABSTRACT

A method for model customization according to an embodiment includes providing a user with prediction results of each of a plurality of pre-trained natural language processing models for a document subjected to analysis selected from a document set including a plurality of documents, acquiring user feedback on the prediction results from the user, generating a plurality of augmented documents from at least one of the plurality of documents based on data attributes of each of the plurality of documents and the user feedback; and retraining at least one of the plurality of natural language processing models, using training data including the plurality of augmented documents.

14 Claims, 6 Drawing Sheets

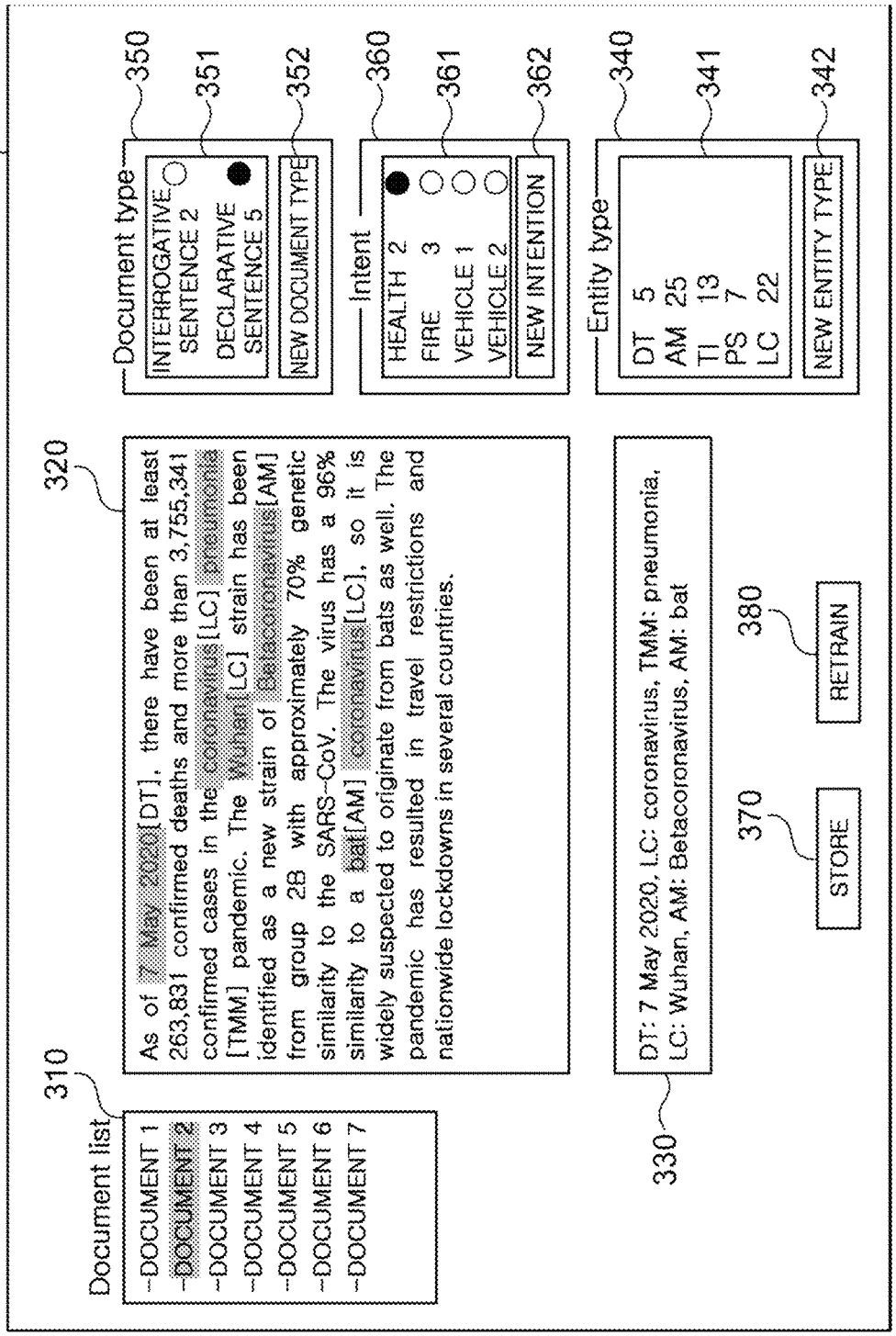

FIG. 4

| | TEXT SUBJECTED TO CONVERSION | CONVERTED TEXT |
|---|---|---|
| Paraphrasing | Sheriff Lee Baca has now decided to recall some 200 badges his department has handed out to local politicians just two weeks after the picture was released by the U.S. attorney's office in support of bribery charges against three city officials. | Two weeks after the US Attorney's Office issued photos to support bribery allegations against three municipal officials, Lee Baca has now decided to recall about 200 badges issued by his department to local politicians. |
| Sentence negation | Snow was predicted later in the weekend for Atlanta and areas even further south. | Snow wasn't predicted later in the weekend for Atlanta and areas even further south. |
| Pronoun swap | It comes after his estranged wife Mona Dotcom filed a $20 million legal claim for cash and assets. | It comes after your estranged wife Mona Dotcom filed a $20 million legal claim for cash and assets. |
| Entity swap | Charlton coach Guy Luzon had said on Monday: 'Alou Diarra is training with us.' | Charlton coach Bordeaux had said on Monday: 'Alou Diarra is training with us.' |
| Number swap | He says he wants to pay off the $12.6million lien so he can sell the house and be done with it, according to the Orlando Sentinel. | He says he wants to pay off the $3.45million lien so he can sell the house and be done with it, according to the Orlando Sentinel. |
| Noise injection | Snow was predicted later in the weekend for Atlanta and areas even further south. | Snow was was predicted later in the weekend for Atlanta and areas even further south. |
| Word swap | Many customers established a return process of the product as it was not suitable for use | Many customers launched a return process of the merchandise as it was not appropriate for use |

METHOD AND APPARATUS FOR CUSTOMIZING NATURAL LANGUAGE PROCESSING MODEL

CROSS REFERENCE TO RELATED APPLICATIONS AND CLAIM OF PRIORITY

This application claims the benefit of Korean Patent Application No. 10-2020-0059639 filed on May 19, 2020 in the Korean Intellectual Property Office, the disclosure of which is incorporated herein by reference in its entirety.

TECHNICAL FIELD

Disclosed embodiments relate to natural language processing technology.

BACKGROUND ART OF THE INVENTION

In general, a text data-labeling tool provides a pre-trained natural language processing model or a user-customized natural language processing model.

Providing a pre-trained model offers the benefit of ease of use for users but fails to offer customization of a model.

Providing a customized model brings about inconvenience since even users knowledgeable about computer programing and natural language processing are forced to customize a model to suit themselves for use according to the way required by the labeling tool, and users non-equipped with relevant knowledge experience difficulty in customizing a model.

SUMMARY

Disclosed embodiments are to provide a method and a device for customizing a natural language processing model.

A method for model customization according to an embodiment includes: providing a user with prediction results of each of a plurality of pre-trained natural language processing models for a document subjected to analysis selected from a document set including a plurality of documents; acquiring user feedback on the prediction results from the user; generating a plurality of augmented documents from at least one of the plurality of documents based on data attributes of each of the plurality of documents and the user feedback; and retraining at least one of the plurality of natural language processing models, using training data including the plurality of augmented documents.

The plurality of natural language processing models may be pre-trained to generate prediction results for different types of natural language processing tasks, respectively.

The user feedback may include modification to at least part of the prediction results of each of the plurality of natural language processing models.

The data attributes may include at least one of metadata for each of the plurality of documents and initial prediction results of each of the plurality of natural language processing models for each of the plurality of documents.

The generating of the plurality of augmented documents may include: selecting at least one document subjected to augmentation among the plurality of documents based on the user feedback and data attributes of each of the plurality of documents; and generating at least one augmented document from each of the at least one document subjected to augmentation.

The document subjected to augmentation may include the document subjected to analysis.

The document subjected to augmentation may include at least one document having a value equal to or greater than a preset value in similarity of the data attributes to the document subjected to analysis among the plurality of documents.

An apparatus for model customization according to an embodiment includes: a feedback acquirer configured to provide a user with prediction results of each of a plurality of pre-trained natural language processing models for a document subjected to analysis selected from a document set including a plurality of documents, and acquire user feedback on the prediction results from the user; a data augmenter configured to generate a plurality of augmented documents from at least one of the plurality of documents based on data attributes of each of the plurality of documents and the user feedback; and a re-trainer configured to retrain at least one of the plurality of natural language processing models using training data including the plurality of augmented documents.

The plurality of natural language processing models may be pre-trained to generate prediction results for different types of natural language processing tasks, respectively.

The user feedback may include modification to at least part of the prediction results of each of the plurality of natural language processing models.

The data attributes may include at least one of metadata for each of the plurality of documents and initial prediction results of each of the plurality of natural language processing models for each of the plurality of documents.

The data augmenter may be further configured to select at least one document subjected to augmentation among the plurality of documents based on the user feedback and data attributes of each of the plurality of documents, and generate at least one augmented document from each of the at least one document subjected to augmentation.

The document subjected to augmentation may include the document subjected to analysis.

The document subjected to augmentation may include at least one document having a value equal to or greater than a preset value in similarity of the data attributes to the document subjected to analysis among the plurality of documents.

Effects of the Invention

According to disclosed embodiments, users who are even unfamiliar with natural language processing and programing codes can generate a customized natural language processing model to suit themselves and a large volume of training data with a simple operation.

BRIEF DESCRIPTION OF THE DRAWINGS

FIG. 3 is an exemplary view of an editor screen according to an embodiment;

FIG. 4 is an exemplary view for describing data augmentation according to an embodiment;

DETAILED DESCRIPTION

Hereinafter, specific embodiments of the present invention will be described with reference to the accompanying drawings. A detailed description below is provided to assist in a comprehensive understanding of a method, a device and/or a system described in the present specification. However, the detailed description is only illustrative, and the present invention is not limited thereto.

In describing embodiments of the present invention, when a specific description of prior art related to the present invention is deemed to make the gist of the present invention unnecessarily vague, the detailed description thereof will be omitted. In addition, terms to be mentioned below are terms defined by considering a function in the present invention, and may vary in accordance with intentions or customs etc. of a user or an operator. Therefore, the terms should be defined based on whole content throughout the present specification. Terms used in the detailed description are only for describing embodiments of the present invention, and should not limit the present invention. A singular expression includes a plural meaning unless clearly used otherwise. In the present description, expressions such as "include" or "have" are for referring to certain characteristics, numbers, steps, operations, components, some or combinations thereof, and it should not be construed as eliminating the presence or possibility of one or more different characteristics, numbers, steps, operations, components, some or combinations thereof besides those described.

Figure 1:
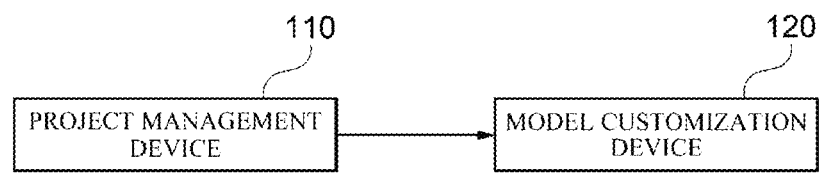
FIG. 1 is a block diagram of a natural language processing system according to an embodiment.

FIG. 1 is a block diagram of a natural language processing system according to an embodiment.

Referring to FIG. 1, a natural language processing (NLP) system 100 according to an embodiment includes a project management device 110 and a model customization device 120.

In an embodiment, the natural language processing system 100 is a system configured to allocate a project for natural language processing to at least one user and support each user to perform the project using a customized natural language processing model.

The project management device 110 may allocate at least one project to at least one user based on project setting information acquired from a project manager.

According to an embodiment, a project allocated to a user may include a plurality of natural language processing tasks and a document set including a plurality of documents subjected to analysis by the plurality of natural language processing tasks. In this case, each of the plurality of natural language processing tasks may be a task for performing one of various types of natural language processing having different analysis purposes such as dialogue act analysis, text classification, sentiment analysis, intent detection, part-of-speech tagging, named entity recognition, information extraction, relation extraction, text summarization, and topic extraction. However, the type of natural language processing performed by the natural language processing task is not necessarily limited to the examples described above, and in addition to the examples described above, a natural language processing task for various types of natural language processing may be included in the project.

According to an embodiment, the project setting information may include information on a natural language processing task to be included in the project and a natural language processing model to be allocated to each natural language processing task.

To be specific, the project management device 110 may provide a project management screen for receiving the project setting information to the project manager, and acquire the project setting information from the project manager through a user interface provided through the project management screen.

For example, the project management device 110 may provide a task list for a plurality of selectable natural language processing tasks to the project manager through the project management screen when project generation is requested from the project manager. In this case, the type of a natural language processing task included in the task list may vary depending on embodiments.

Meanwhile, when the project manager selects a natural language processing task to be included in the project from the task list, the project management device 110 may provide a model list of at least one natural language processing model allocable to the selected natural language processing task to the project manager through the management screen.

In this case, the natural language processing models included in the model list may be a pre-trained model to generate prediction results for a specific natural language processing task using artificial neural network-based training algorithms such as multi-layer perceptron, bidirectional long short-term memory (LSTM), recurrent neural network (RNN), convolutional neural network (CNN), and bidirectional encoder representations from transformers (BERT), or statistical training algorithms such as hidden markov model, decision tree, naïve bayes, support vector machine (SVM), and conditional random field (CRF), respectively. However, the type of a natural language processing model is not necessarily limited to the examples described above, and a plurality of natural language processing models trained in individually different ways for the same natural language processing task may be provided to the project manager according to an embodiment.

Meanwhile, when the project setting information is acquired from the project manager, the project management device 110 may allocate a project according to the acquired project setting information to at least one user selected by the project manager.

For example, the project management device 110 may provide a user list including at least one pre-registered user to the project manager through the project management screen. In this case, the project management device 110 may allocate a project according to the project setting information to at least one user selected from the user list by the project manager.

The model customization device 120 is a device configured to provide prediction results of a natural language processing model allocated to each of a plurality of natural language processing tasks included in a project to a user to whom the project is allocated, retrain each natural language processing model based on the user's user feedback on the provided prediction results to customize each natural language processing model to suit the user.

Figure 2:
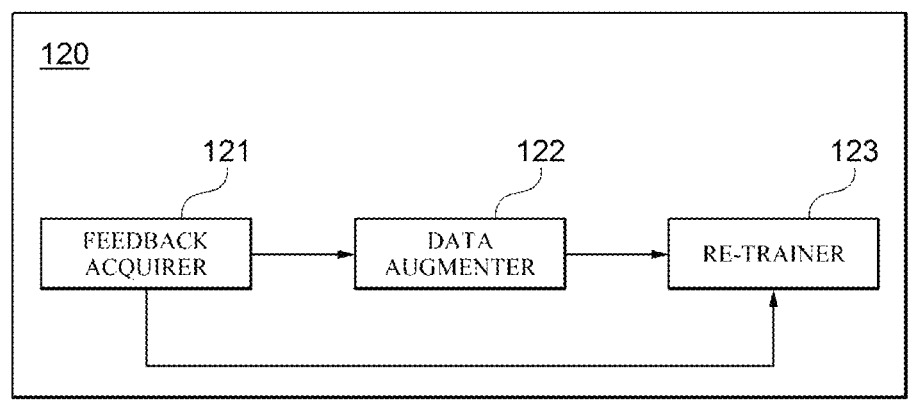
FIG. 2 is a block diagram of a device for model customization according to an embodiment.

FIG. 2 is a block diagram of a device for model customization according to an embodiment.

Referring to FIG. 2, the model customization device 120 according to an embodiment includes a feedback acquirer 121, a data augmenter 122, and a re-trainer 123.

The feedback acquirer 121 provides, to a user, prediction results of each of a plurality of pre-trained natural language processing models for a document subjected to analysis selected from a document set including a plurality of documents, and acquires user feedback on the prediction results provided from the user.

In this case, according to an embodiment, the document set may be a collection of documents to be analyzed by a project allocated to the user.

In addition, according to an embodiment, a plurality of natural language processing models may be a natural language processing model allocated to each of a plurality of natural language processing tasks included in the project allocated to the user. That is, the plurality of natural language processing models may be pre-trained models to generate prediction results for different types of natural language processing tasks, respectively.

According to an embodiment, the feedback acquirer 121 may provide prediction results of each natural language processing model for a document subjected to analysis to a user through an editor screen and acquire user feedback on the prediction results from the user through a user interface provided through the editor screen.

FIG. 3 is an exemplary view of an editor screen according to an embodiment.

In the example shown in FIG. 3, for a document set including seven documents, prediction results of each of a natural language processing model pre-trained for named entity recognition (hereinafter referred to as a "named entity recognition model"), a natural language processing model pre-trained for document type classification (hereinafter referred to as a "document classification model"), and a natural language processing model pre-trained for intention analysis (hereinafter referred to as an "intention analysis model") are assumed to be generated.

Referring to FIG. 3, a list of documents included in the document set is displayed in a document selection region 310 of an editor screen 300, and a user may select a document subjected to analysis from the list displayed in the document selection region 310.

Meanwhile, when the document subjected to analysis is selected in the document selection region 310 by the user, the feedback acquirer 121 may display, on the editor screen 300, prediction results of each of the named entity recognition model, the document classification model, and the intention analysis model for the selected document subjected to analysis.

For example, when the user selects 'document 2' as a document subjected to analysis in the document selection region 310, the feedback acquirer 121 may display prediction results of the named entity recognition model for 'document 2' in a text display region 320 along with the whole text included in 'document 2' or in a separate region 330.

To be specific, the feedback acquirer 121 may display the whole text included in 'document 2' in the text display region 320, and tag and display a predicted entity type to each named entity of which an entity type is predicted by the named entity recognition model among the texts displayed in the text display region 320.

In addition, the feedback acquirer 121 may display each named entity of which an entity type is predicted by the named entity recognition model in 'document 2' in a region 330 separate from the text display region 320 along with the predicted entity type.

Meanwhile, the user may select a specific named entity of which an entity type is tagged in the text display region 320, and then select one of the entity types displayed in an entity type list 341 of an entity type feedback region 340 to change the entity type for the selected named entity.

For example, when the user drags a named entity 'coronavirus' where the entity type is tagged as 'LC' in the text display region 320 and then selects 'AM' from the entity type list 341, the feedback acquirer 121 may change the tag for 'coronavirus' from 'LC' to 'AM' in the text display region 320 and in the region 330 displaying entity type prediction results.

In addition, the user may select a specific named entity of which an entity type is not tagged in the text display region 320 and then select one of the entity types displayed in the entity type list 341 to tag the entity type to the selected named entity in the text display region 320.

For example, when the user drags 'SARS-CoV' in the text display region 320, and then selects 'AM' from the entity type list 341, the feedback acquirer 121 may display the tag 'AM' for 'SARS-CoV' in the text display region 320, and add 'SARS-CoV' and the tag 'AM' for 'SARS-CoV' to the region 330 displaying entity type prediction results.

Meanwhile, the entity type list 341 may display an entity type that the named entity recognition model may generate as prediction results. To be specific, each entity type 'DT', 'AM', 'TI', 'PS', and 'LC' displayed in the entity type list 341 may be an entity type trained through pre-training for the named entity recognition model. In addition, the number displayed to the right of each entity type in the entity type list 341 indicates the number of times each entity type is tagged in all documents included in a document set, and through this, the user may recognize the frequency of each entity type in the document set.

Meanwhile, when the entity type list 341 does not include an entity type desired by the user, the user may select an entity type add button displayed in the entity type feedback region 340 to add a new entity type which is not included in the entity type list 341 to the entity type list 341. In this case, the user may select a named entity of which an entity type is tagged in the text display region 320, and then select a newly-added entity type from the entity type list 341 to change the entity type for the selected named entity to the newly-added entity type. In addition, the user may select a named entity of which an entity type is not tagged in the text display region 320, and then select a newly-added entity type from the entity type list 341 to tag the newly-added entity type to the selected named entity.

Meanwhile, a document type list 351 of a document type feedback region 350 may display a document type that a document classification model may generate as prediction results. To be specific, each document type 'interrogative sentence' and 'declarative sentence' displayed in the document type list 351 may be a document type trained through pre-training for the document classification model. In addition, the number displayed to the right of each document type in the document type list 351 indicates the number of documents classified into each document type among all documents included in a document set and through this, the user may recognize the frequency of each document type in the document set.

Meanwhile, the document type indicated by a solid circle in the document type list 351 represents a document type predicted by the document classification model for a currently selected document subjected to analysis. That is, the illustrated example indicates that the document classification model predicts the document type for 'document 2' as 'declarative sentence'.

Meanwhile, the user may select one of other document types indicated by an empty circle in the document type list 351 to change the document type for a document subjected to analysis. For example, the user may select 'interrogative sentence' from the document type list 351 to change the document type for 'document 2' to 'interrogative sentence' from 'declarative sentence'.

In addition, the user may select the document type add button 352 displayed in the document type feedback region 350 to add a new document type which is not included in the document type list 351 to the document type list 351. In this case, the user may select the newly-added document type from the document type list 351 to change the document type for a document subjected to analysis to the newly added document type.

Meanwhile, an intention list 361 of an intention analysis feedback region 360 may display intention items that the intention analysis model can generate as prediction results. To be specific, each intention item "health", "fire", "vehicle", and "contact" displayed in the intention list 361 may be an intention item trained through pre-training for the intention analysis model. In addition, the number displayed to the right of each intention item in the intention list 361 indicates the number of documents classified as the intention item among all documents included in a document set, through this, the user can see the frequency of each intention item in the document set.

Meanwhile, the intention item indicated by a solid circle in the intention list 361 represents an intention item predicted by the intention analysis model for a currently selected document subjected to analysis. That is, the illustrated example indicates that the intention analysis model predicts the intention of 'document 2' as 'health'.

Meanwhile, the user may select one of other intention items indicated by an empty circle in the intention list 361 to change the intention of a document subjected to analysis. For example, the user may select 'fire' from the intention list 361 to change the intention of 'document 2' to 'fire' from 'health'.

In addition, the user may select an intention add button 362 displayed in the intention analysis feedback region 360 to add a new intention item which is not included in the intention list 361 to the intention list 361. In this case, the user may select the newly-added intention item from the intention list 361 to change the intention of a document subjected to analysis to the newly added intention item.

Meanwhile, after at least one prediction result among the named entity recognition model, the document classification model, and the intention analysis model for a document subjected to analysis is modified according to user inputs for at least one among the entity type feedback region 340, the document type feedback region 350, and the intention analysis feedback region 360, when the user selects a storage button 370 displayed in the editor screen 300, the feedback acquirer 121 may store the prediction result modified by the user as user feedback. In this case, according to an embodiment, the prediction result which is not modified by the user as well may be included as user feedback.

Referring back to FIG. 2, the data augmenter 122 generates a plurality of augmented documents from at least one of the plurality of documents included in the document set based on user feedback on prediction results of each of a plurality of natural language processing models for a document subjected to analysis and data attributes of each of a plurality of documents included in a document set.

To be specific, the data augmenter 122 may select at least one of the plurality of documents included in the document set as a document subjected to augmentation based on the user feedback and the data attributes.

According to an embodiment, the document subjected to augmentation may include at least one document subjected to analysis for which user feedback on prediction results is acquired.

In addition, according to an embodiment, the document subjected to augmentation may include at least one document having a value equal to or greater than a preset value in similarity of data attributes to each of at least one document subjected to analysis for which user feedback is acquired among a plurality of documents included in a document set.

Meanwhile, according to an embodiment, data attributes for a specific document included in the document set may include metadata for the specific document and initial prediction results of each of a plurality of natural language processing models for the specific document.

To be specific, the metadata for the specific document may include various information extractable from the specific document and the document set, such as length of the specific document, number of sentences in the specific document, total number of documents in the document set, average length and variance of documents in the document set.

In addition, the initial prediction results of the natural language processing model for the specific document may indicate prediction results by the natural language processing model which is not retrained according to user feedback. To be specific, the natural language processing model allocated to each natural language processing task included in a project may pre-generate initial prediction results for each document included in the document set before being retrained for customization, and in this case, the generated initial prediction results may be used as data attributes for each document included in the document set.

Meanwhile, according to an embodiment, the data augmenter 122 may generate at least one augmented document from each document subjected to augmentation through a text data augmentation technique using for example, paraphrasing, sentence negation, pronoun swap, entity swap, word swap, number swap, noise injection, etc. as illustrated in FIG. 4.

In this case, paraphrasing may be performed by converting a text subjected to conversion into another text having the same intention. For example, when the text subjected to conversion is a text written in English, the data augmenter 122, for example, may translate the text subjected to conversion into at least one other language (e.g., Korean, German, French, etc.) using a translator providing machine translation between two or more languages and then retranslate the translated text back into English to generate a text having the same intention as the text subjected to conversion.

Sentence negation may be performed by converting a word indicating affirmative or negative in a text subjected to conversion into a word indicating opposite meaning. For example, as the example shown in FIG. 4, the data augmenter 122 may change "was" to "wasn't" in a text subjected to conversion to convert the text subjected to conversion from an affirmative sentence to a negative sentence.

Pronoun swap may be performed by converting at least one of pronouns included in a text subjected to conversion into another pronoun of the same kind. For example, as the example shown in FIG. 4, the data augmenter 122 may change the possessive pronoun "his" included in a text subjected to conversion to the possessive pronoun "your" to convert the text subjected to conversion.

Entity swap may be performed by changing at least one of named entities included in a text subjected to conversion to another named entity of the same entity type. For example, as the example shown in FIG. 4, the data augmenter 122 may change a named entity "Guy Luzon" included in a text subjected to conversion to another named entity "Bordeaux" of the same entity type to convert the text subjected to conversion.

Number swap may be performed by changing at least one of numbers included in a text subjected to conversion to any other number. For example, as the example shown in FIG. 4, the data augmenter 122 may change a number "12.6 million" included in a text subjected to conversion to another identical number "3.45 million" to convert the text subjected to conversion.

Noise injection may be performed by adding an arbitrary text to a text subjected to conversion. For example, as the example shown in FIG. 4, the data augmenter 122 may add an arbitrary word "was" to a text subjected to conversion to convert the text subjected to conversion.

Word swap may be performed by changing at least one of words included in a text subjected to conversion to a synonym using a predefined thesaurus. For example, as the example shown in FIG. 4, the data augmenter 122 may change the words "established", "product" and "suitable" in a text subjected to conversion to the synonyms "launched", "merchandise" and "appropriate", respectively to convert the text subjected to conversion.

Meanwhile, the text data augmentation technique usable to generate an augmented document from a document subjected to augmentation is not necessarily limited to the examples described above, and various known text data augmentation techniques may be used in addition to the examples described above.

A re-trainer 123 retrains at least one of a plurality of natural language processing models using training data including a plurality of augmented documents generated by the data augmenter 122.

According to an embodiment, the re-trainer 123 may retrain a natural language processing model generating the prediction results modified by user feedback among prediction results of each of a plurality of natural language processing models for a document subjected to analysis.

As a specific example, in the example shown in FIG. 3, when the prediction results of the named entity recognition model among prediction results of each of the named entity recognition model, the document classification model, and the intention analysis model for a document subjected to analysis are modified by user feedback, the re-trainer 123 may retrain the named entity recognition model.

However, according to an embodiment, the re-trainer 123 may retrain all natural language processing models when the user feedback on prediction results of each of a plurality of natural language processing models for the document subjected to analysis is acquired.

In addition, according to an embodiment, the re-trainer 123 may retrain at least one natural language processing model based on user feedback for each document subjected to analysis when the user feedback on a plurality of documents subjected to analysis is acquired. For example, in the example shown in FIG. 3, when a user sequentially selects a part of a plurality of documents as a document subjected to analysis in the document selection region 310 to modify prediction results of each of at least one natural language processing model for each selected document subjected to analysis, and to then selects a retraining button 380 to request retraining, the re-trainer 123 may retrain at least one natural language processing model based on the user feedback acquired for each document subjected to analysis by the time of the retraining request.

Meanwhile, according to an embodiment, the re-trainer 123 may generate a user feedback characteristic based on user feedback, and use the generated user feedback characteristic to retrain a plurality of natural language processing models.

In this case, the user feedback characteristic may include at least one among similarity, label order, model association, and user association.

To be specific, the similarity indicates the similarity between prediction results of a natural language processing model and prediction results modified by user feedback, and may suggest that the greater the value of the similarity, the less the modification by the user feedback.

For example, a similarity Sim (m, u) for a natural language processing model m according to user feedback of a user u may be calculated according to Equation 1 below.

$$Sim(m, u) = 1 - \frac{|D_m|}{|L_m|} \qquad \text{[Equation 1]}$$

In this case, Lm indicates a universal set of labels generated as prediction results by the natural language processing model m, and $D_m$ indicates a universal set of labels modified by the user feedback among the labels generated by the natural language processing model m.

Meanwhile, the label order may indicate data sorted in order of probability that labels that may be labeled by the natural language processing model will be labeled for a specific label subject. As a specific example, the label order $O(T)_m$ based on the prediction results of the natural language processing model m for 'T' subjected to labeling, may have the form of Equation 2 below.

$$O(T)_m = [L_1, S_1, L_2, S_2, \ldots, L_n, S_n] \qquad \text{[Equation 2]}$$

In this case, $L_n$ indicates a label, $S_n$ indicates the probability of a label for 'T' becoming $L_n$, and $L_n$ and $S_n$ may be sorted in descending order according to the size of $S_n$.

For example, when labels that may be labeled by the natural language processing model m are 'Label 1', 'Label 2' and 'Label 3', and the natural language processing model m predicts the probability of the labels for a specific word 'pear' included in a document subjected to analysis as 0.6, 0.3, and 0.1, respectively, the label order for 'pear' may have the form of Equation 3 below.

$$O(\text{pear})_m = [\text{Label 1}, 0.6, \text{Label 2}, 0.3, \text{Label 3}, 0.1] \qquad \text{[Equation 3]}$$

Meanwhile, in the example described above, when a user modifies the label for the word 'pear' through user feedback as Label 2, the label order for 'pear' may be modified, for example, as in Equation 4 below.

$$O(\text{pear})_{m,u} = \left[\text{Label 2}, 0.3 + 0.5 = 0.65, \right.$$
$$\left. \text{Label 1}, \frac{0.6}{2} = 0.3, \text{Label 3}, \frac{0.1}{2} = 0.05\right] \qquad \text{[Equation 4]}$$

Meanwhile, according to an embodiment, the label order modified according to user feedback may be used as training data for retraining the natural language processing model, or may be used to understand the user's propensity.

Meanwhile, the model association indicates the association between natural language processing models. According to an embodiment, the model association may include independence and similarity between models.

In this case, according to an embodiment, the independence between any two natural language processing models may have a higher value when the association between a natural language processing task performed by each natural language processing model and training data used for training each natural language processing model becomes lower.

In addition, according to an embodiment, the similarity between any two natural language processing models may have a higher value when the similarity among a natural language processing task performed by each natural language processing model, training data used for training each natural language processing model, and training algorithms used for training each natural language processing model becomes greater.

Meanwhile, the model association may change as the natural language processing model is retrained by user feedback, and when retraining, the re-trainer 123 may adjust weights such that the similarity further increases between models having similarity increased by user feedback and the similarity decreases between models having similarity decreased by user feedback.

In addition, according to an embodiment, when retraining according to user feedback, models having high similarity may share the user feedback at a ratio of similarity.

Meanwhile, when the same project is allocated to a plurality of users by a project manager, user association may indicate the association between users to whom the project is allocated.

According to an embodiment, the user association may be calculated using similarity based on user metadata for each user (e.g., affiliation, gender, age, etc.), project history, and user feedback history.

Meanwhile, according to an embodiment, the re-trainer 134 may use, based on the user association, user feedback acquired from each of a plurality of users to retrain each natural language processing model allocated to a project. To be specific, when retraining is requested by a specific user among the plurality of users to whom the same project is allocated, the re-trainer 134 may determine weights for user feedback acquired from each of different users based on the user association with the user requesting retraining, and retrain each natural language processing model based on the determined weights. For example, the re-trainer 134 sets a weight for user feedback acquired from the user requesting retraining to 1, and sets a weight for user feedback acquired from each of the remaining users to 1 or less based on the user association with the user requesting retraining, respectively to perform retraining.

Figure 5:
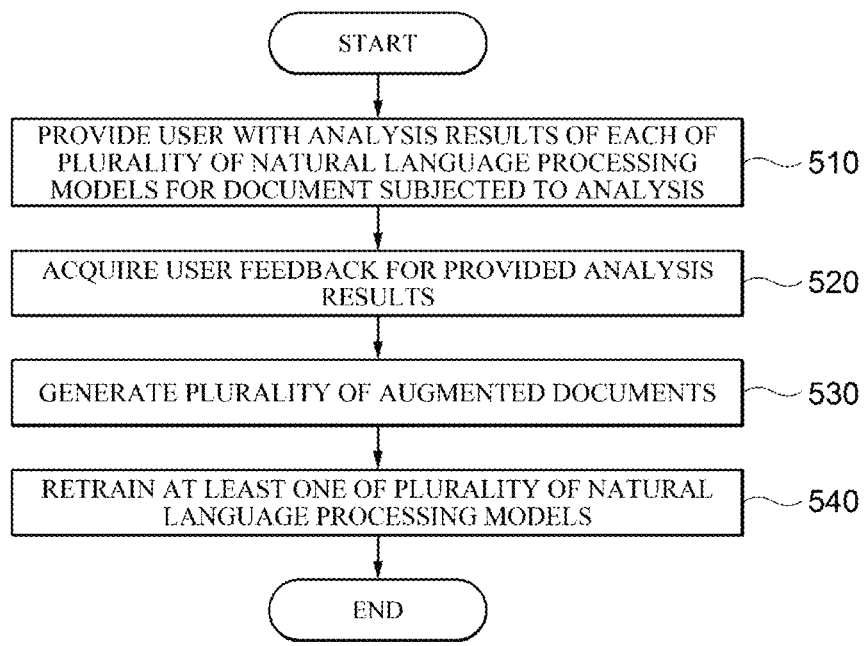
FIG. 5 is a flowchart of a method for model customization according to an embodiment.

FIG. 5 is a flowchart of a method for model customization according to an embodiment.

The method shown in FIG. 5 may be performed, for example, by the model customization device 120 shown in FIG. 2.

Referring to FIG. 5, first, the model customization device 120 provides a user with prediction results of each of a plurality of pre-trained natural language processing models for a document subjected to analysis selected from a document set including a plurality of documents (510).

In this case, according to an embodiment, the plurality of natural language processing models may be pre-trained models to generate prediction results for different types of natural language processing tasks, respectively.

Thereafter, the model customization device 120 acquires user feedback on prediction results of each of the plurality of natural language processing models from the user (520).

In this case, according to an embodiment, the user feedback may include modification to at least part of the prediction results of each of the plurality of pre-trained natural language processing models for the document subjected to analysis.

Then, the model customization device 120 generates a plurality of augmented documents from at least one of the plurality of documents included in the document set based on data attributes of each of the plurality of documents included in the document set and the acquired user feedback (530).

To be specific, according to an embodiment, the model customization device 120 may select at least one document subjected to augmentation among the plurality of documents based on the acquired user feedback and the data attributes of each of the plurality of documents, and generate at least one augmented document from each selected document subjected to augmentation.

In this case, according to an embodiment, the document subjected to augmentation may include a document subjected to analysis.

In addition, according to an embodiment, the document subjected to augmentation may include at least one document having a value equal to or greater than a preset value in similarity of the data attributes to the document subjected to analysis among the plurality of documents included in the document set.

Meanwhile, according to an embodiment, the data attributes may include at least one of metadata for each of the plurality of documents and initial prediction results of each of a plurality of natural language processing models for each of the plurality of documents.

Thereafter, the model customization device 120 retrains at least one of the plurality of natural language processing models using training data including the plurality of generated augmented documents (540).

Meanwhile, at least some of the operations in the flowchart shown in FIG. 5 may be performed by changing the order, be performed by combining with other operations together, be skipped, be performed by being divided into detailed operations, or be performed by adding at least one operation which is not shown.

Figure 6:
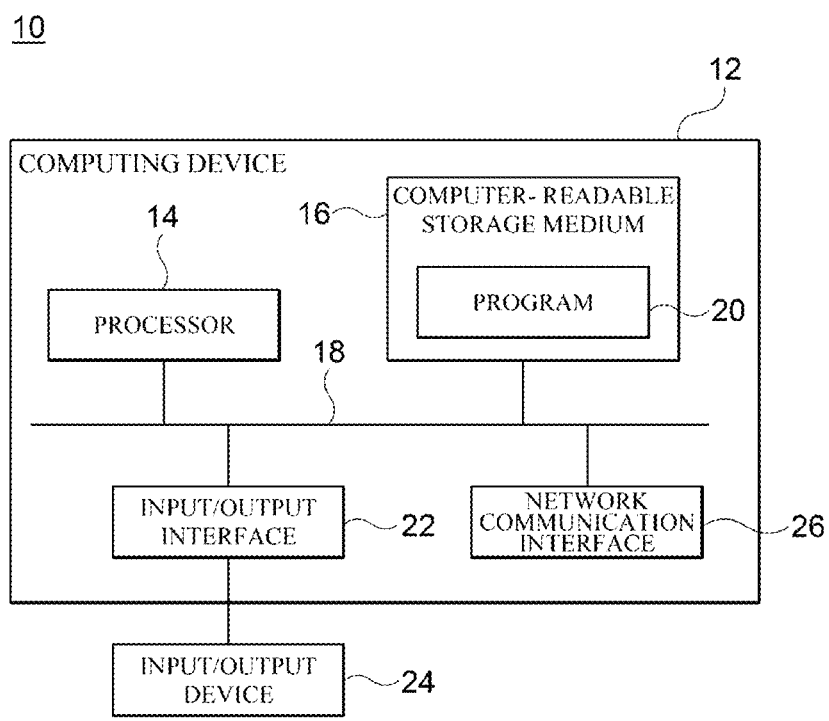
FIG. 6 is a block diagram for describing an example of a computing environment including a computing device according to an embodiment.

FIG. 6 is a block diagram for describing an example of a computing environment including a computing device according to an embodiment.

In the illustrated embodiment, each component may have different functions and capabilities in addition to those described below, and may include additional components in addition to those described below.

An illustrated computing environment 10 includes a computing device 12. In an embodiment, the computing device 12 may be at least one component included in the model customization device 120. The computing device 12 includes at least one processor 14, a computer-readable storage medium 16 and a communication bus 18. The processor 14 may make the computing device 12 operate according to the exemplary embodiments described above. For example, the processor 14 may execute at least one program stored in the computer-readable storage medium 16. The at least one program may include at least one computer executable instruction, and the computer executable instruction may be configured to cause, when executed by the processor 14, the computing device 12 to perform operations according to an exemplary embodiment.

The computer-readable storage medium 16 is configured to store the computer executable instruction or program codes, program data and/or other suitable forms of information. A program 20 stored in the computer-readable storage medium 16 includes a set of instructions executable by the processor 14. In an embodiment, the computer-readable storage medium 16 may be memory (volatile memory such as random access memory, non-volatile memory, or a suitable combination thereof), at least one magnetic disk storage device, optical disk storage devices, flash memory devices, other types of storage media accessed by the computing device 12 and storing desired information, or suitable combinations thereof.

The communication bus 18 interconnects various other components of the computing device 12, including the processor 14 and the computer-readable storage medium 16.

The computing device 12 may also include at least one input/output interface 22 providing an interface for at least input/output device 24 and at least one network communication interface 26. The input/output interface 22 and the network communication interface 26 are connected to the communication bus 18. The input/output device 24 may be connected to other components of the computing device 12 through the input/output interface 22. Exemplary input/output device 24 may include pointing devices (e.g., a mouse or a trackpad), keyboards, touch input devices (e.g., a touch pad or a touch screen), voice or sound input devices, input devices such as various types of sensor devices and/or imaging devices, and/or output devices such as display devices, printers, speakers, and/or network cards. The exemplary input/output device 24 may be included inside the computing device 12 as a component constituting the computing device 12, and may be connected to the computing device 12 as a separate device distinct from the computing device 12.

Illustrative embodiments of the present invention have been described in detail above, but those of ordinary skill in the art to which the present invention pertains will understand that various modifications are possible without departing from the scope of the present invention. Therefore, the scope of the present invention should not be defined as being limited to the embodiments described above, but should be defined by claims below and their equivalents.

The invention claimed is:

1. A method for model customization, comprising:
providing a user with prediction results of each of a plurality of pre-trained natural language processing models for a document subjected to analysis selected from a document set including a plurality of documents;
acquiring user feedback on the prediction results from the user;
generating a plurality of augmented documents from at least one of the plurality of documents based on data attributes of each of the plurality of documents and the user feedback; and
retraining at least one of the plurality of natural language processing models, using training data including the plurality of augmented documents;
wherein the retraining of the at least one of the plurality of natural language processing models comprises generating a user feedback characteristic based on user feedback, and the user feedback characteristic comprises at least one among similarity, label order, model association, and user association.

2. The method of claim 1, wherein the plurality of natural language processing models are pre-trained to generate prediction results for different types of natural language processing tasks, respectively.

3. The method of claim 1, wherein the user feedback comprises modification to at least part of the prediction results of each of the plurality of natural language processing models.

4. The method of claim 1, wherein the data attributes comprise at least one of metadata for each of the plurality of documents and initial prediction results of each of the plurality of natural language processing models for each of the plurality of documents.

5. The method of claim 1, wherein the generating of the plurality of augmented documents comprises:
selecting at least one document subjected to augmentation among the plurality of documents based on the user feedback and data attributes of each of the plurality of documents; and
generating at least one augmented document from each of the at least one document subjected to augmentation.

6. The method of claim 5, wherein the document subjected to augmentation comprises the document subjected to analysis.

7. The method of claim 5, wherein the document subjected to augmentation comprises at least one document having a value equal to or greater than a preset value in similarity of the data attributes to the document subjected to analysis among the plurality of documents.

8. An apparatus for model customization, comprising:
a feedback acquirer configured to provide a user with prediction results of each of a plurality of pre-trained natural language processing models for a document subjected to analysis selected from a document set including a plurality of documents, and acquire user feedback on the prediction results from the user;
a data augmenter configured to generate a plurality of augmented documents from at least one of the plurality of documents based on data attributes of each of the plurality of documents and the user feedback; and
a re-trainer configured to retrain at least one of the plurality of natural language processing models, using training data including the plurality of augmented documents, the re-trainer configured to generate a user feedback characteristic based on user feedback, the user feedback characteristic comprising at least one among similarity, label order, model association, and user association.

9. The apparatus of claim 8, wherein the plurality of natural language processing models are pre-trained to generate prediction results for different types of natural language processing tasks, respectively.

10. The apparatus of claim 8, wherein the user feedback comprises modification to at least part of the prediction results of each of the plurality of natural language processing models.

11. The apparatus of claim 8, wherein the data attributes comprise at least one of meta data for each of the plurality of documents and initial prediction results of each of the plurality of natural language processing models for each of the plurality of documents.

12. The apparatus of claim 8, wherein the data augmenter is further configured to select at least one document subjected to augmentation among the plurality of documents based on the user feedback and data attributes of each of the plurality of documents, and generate at least one augmented document from the at least one document subjected to augmentation.

13. The apparatus of claim 12, wherein the document subjected to augmentation comprises the document subjected to analysis.

14. The apparatus of claim 12, wherein the document subjected to augmentation comprises at least one document having a value equal to or greater than a preset value in similarity of the data attributes to the document subjected to analysis among the plurality of documents.

\* \* \* \* \*